(12) United States Patent
Okuhara et al.

(10) Patent No.: US 8,981,228 B2
(45) Date of Patent: Mar. 17, 2015

(54) GROMMET FOR WIRE HARNESS

(75) Inventors: Takashi Okuhara, Yokkaichi (JP);
Tsutomu Sakata, Yokkaichi (JP)

(73) Assignee: Sumitomo Wiring Systems, Ltd.,
Yokkaichi (JP)

( * ) Notice: Subject to any disclaimer, the term of this patent is extended or adjusted under 35 U.S.C. 154(b) by 79 days.

(21) Appl. No.: 13/575,180

(22) PCT Filed: Nov. 17, 2010

(86) PCT No.: PCT/JP2010/070435
§ 371 (c)(1),
(2), (4) Date: Jul. 25, 2012

(87) PCT Pub. No.: WO2011/125253
PCT Pub. Date: Oct. 13, 2011

(65) Prior Publication Data
US 2013/0008693 A1     Jan. 10, 2013

(30) Foreign Application Priority Data
Apr. 1, 2010 (JP) ................................. 2010-084846

(51) Int. Cl.
*H01B 17/58*   (2006.01)
*B60R 16/02*   (2006.01)
*F16L 5/10*    (2006.01)

(52) U.S. Cl.
CPC .............. *B60R 16/0222* (2013.01); *F16L 5/10* (2013.01)
USPC .................................................... 174/152 G

(58) Field of Classification Search
CPC ....... H02G 3/046; H02G 3/047; H01B 17/58; B60R 16/0207; B60R 16/0215; B60R 16/0222
See application file for complete search history.

(56) References Cited

FOREIGN PATENT DOCUMENTS

| JP | 6-38339 | 2/1994 |
|---|---|---|
| JP | 9-147649 | 6/1997 |
| JP | 11-63313 | 3/1999 |
| JP | 2001-327048 | 11/2001 |
| JP | 2007-135253 | 5/2007 |
| JP | 2009-225509 | 10/2009 |
| WO | WO 2009147762 A1 * | 12/2009 |
| WO | WO 2009147763 A1 * | 12/2009 |

* cited by examiner

*Primary Examiner* — Timothy Thompson
*Assistant Examiner* — Michael F McAllister
(74) *Attorney, Agent, or Firm* — Gerald E. Hespos; Michael J. Porco; Matthew T. Hespos

(57) ABSTRACT

A grommet is fit externally to a wire harness to be wired in a vehicle and mounted in a through hole of a vehicle-body panel. The grommet has a small-diameter cylindrical portion molded of elastomer and through which the wire harness is tightly inserted. A radial projection in the form of bellows projects radially out from an outer peripheral position of an intermediate longitudinal part of the small-diameter portion. An outer peripheral portion is connected to the outer peripheral end of the radial projection. The outer peripheral portion has a conical tubular shape and is connected at an intermediate longitudinal position to the radial projection. An annular vehicle-body locking recess is provided on the outer peripheral surface of a large-diameter side of the outer peripheral portion. A small-diameter side is thicker than the radial projection portion.

4 Claims, 4 Drawing Sheets

GROMMET FOR WIRE HARNESS

BACKGROUND OF THE INVENTION

1. Field of the Invention

The present invention relates to a grommet for wire harness and is specifically made of rubber or elastomer to be externally fitted to a wire harness to be wired in an automotive vehicle and mounted in a through hole of a vehicle-body panel from being detached from the through hole particularly by increasing a retention force in the through hole.

2. Description of the Related Art

Conventionally, a large number of grommets for wire harness of this type have been proposed. In many cases, these grommets are designed to improve waterproof performance of a wire harness inserted through the grommet, reduce an insertion force at the time of mounting the grommet into a through hole of a vehicle-body panel and make the wire harness easily bendable in the case of bending and wiring the wire harness from a position drawn out from the grommet mounted in the through hole of the vehicle-body panel.

For example, to reduce an insertion force of a grommet into a through hole and make a wire harness easily bendable, there has been proposed a grommet 100 shown in FIGS. 6(A) and 6(B) in Japanese Unexamined Patent Publication No. H11-63313. This grommet 100 is formed such that a small-diameter cylindrical portion 101 through which a wire harness 110 is tightly inserted and a large-diameter cylindrical portion 103 including an annular recess 104 to be fitted to a through hole 109 of a vehicle-body panel 108 are connected via a radially extending wall portion 102, and an elastic portion 105 projecting toward the large-diameter cylindrical portion 103 in parallel to an axial direction of the grommet 100 is provided at a position where the wall portion 102 is connected to the small-diameter cylindrical portion 101. Reinforcing ribs 107 are provided in a recess 106 of the elastic portion 105 at the small-diameter cylindrical portion 101 side.

The grommet 100 can increase its restoring force after the deformation of the elastic portion 105 by the reinforcing ribs 107. However, the reinforcing ribs 107 make the wire harness 110 hard to bend when the wire harness 110 drawn out from the grommet 100 mounted in the through hole needs to be steeply bent and wired, and reduce deformability of the grommet 100 at the time of mounting the grommet into the through hole, thereby causing problems such as a reduction in an effect of reducing an insertion force into the through hole.

SUMMARY OF THE INVENTION

The present invention was developed in view of the above problem and an object thereof is to improve performance of bending and wiring a wire harness drawn out from a grommet, reduce an insertion force at the time of mounting the grommet into a through hole and maintain a retention force after the grommet is mounted into the through hole.

To solve the above problem, the present invention is directed to a grommet for wire harness to be externally fitted to a wire harness to be wired in a vehicle and mounted into a through hole of a vehicle-body panel, comprising a small-diameter cylindrical portion which is molded of rubber or elastomer and through which the wire harness is tightly inserted; a radial projecting portion which is in the form of bellows projecting radially outwardly from an outer peripheral position of an intermediate part of the small-diameter cylindrical portion in a longitudinal direction; and an outer peripheral cylindrical portion which is connected to the outer peripheral end of the radial projecting portion; wherein the outer peripheral cylindrical portion has a conical tubular shape and is connected at an intermediate position in a longitudinal direction thereof to the radial projecting portion, an annular vehicle-body locking recess is provided on the outer peripheral surface of a large-diameter side of the outer peripheral cylindrical portion, and a small-diameter side is formed into a thick portion thicker than the radial projecting portion.

Since the radial projecting portion in the form of bellows is interposed, in the above grommet, between the outer peripheral cylindrical portion including the vehicle-body locking recess to be engaged with the through hole of the vehicle-body panel and the small-diameter cylindrical portion through which the wire harness is tightly inserted, the wire harness immediately after being pulled out from the grommet mounted on the vehicle-body panel can be easily bent and wired. In addition, an insertion force can be reduced at the time of inserting the grommet into the through hole by allowing the radial projecting portion in the form of bellows to deform.

Further, the outer peripheral cylindrical portion including the vehicle-body locking recess on the large-diameter side in an axial direction includes the thick portion on the small-diameter side. Thus, if a tensile force is exerted to the wire harness and a load to turn up the vehicle-body locking recess in a direction to be detached from the peripheral edge of the through hole acts on the outer peripheral cylindrical portion via the small-diameter cylindrical portion and the radial projecting portion in a state where the wire harness is mounted through the vehicle-body panel via the grommet, the vehicle-body locking recess can be prevented from being turned up to be detached from the peripheral edge of the through hole by suppressing the deformation thereof by the thick portion provided on the other side of the outer peripheral cylindrical portion. In this way, it is possible to increase a retention force for preventing the grommet mounted in the through hole of the vehicle-body panel from being detached from the through hole.

The radial projecting portion is preferably in the form of bellows in which one V-shaped projecting portion projects in a diameter-increasing direction of the outer peripheral cylindrical portion.

The radial projecting portion in the form of bellows may be shaped to include one large V-shaped projecting portion as described above or may be shaped to include a plurality of continuous V-shaped projecting portions having a small pitch. It is sufficient to make the wire harness inserted through the small-diameter cylindrical portion easily bendable and make the grommet easily deformable when the grommet is inserted into and engaged with the through hole by expansion and contraction of the radial projecting portion.

Preferably, the length of the small-diameter cylindrical portion in an axial direction is two to three times as large as that of the outer peripheral cylindrical portion, the small-diameter cylindrical portion projects from both ends of the outer peripheral cylindrical portion in the longitudinal direction, and the wire harness inserted through the small-diameter cylindrical portion and both ends of the small-diameter cylindrical portion are fixed by winding a tape.

Note that it is sufficient to connect the small-diameter cylindrical portion to the inner peripheral end of the radial projecting portion and to make the outer peripheral end continuous with the outer peripheral cylindrical portion, and the small-diameter cylindrical portion may not penetrate through the outer peripheral cylindrical portion and project from both ends of the outer peripheral cylindrical portion.

As described above, in the grommet according to the present invention in which the small-diameter cylindrical portion through which the wire harness is tightly inserted and the outer peripheral cylindrical portion including the vehicle-body locking recess are connected by the radial projecting portion in the form of bellows, the outer peripheral cylindrical portion includes the thick portion on the side opposite to the vehicle-body locking recess in the axial direction. Thus, even if a tensile force is exerted to the wire harness and the vehicle-body locking recess receives a force in a direction to be detached from the peripheral edge of the through hole of the vehicle body, deformation of the outer peripheral cylindrical portion can be suppressed by the thick portion, detachment of the vehicle-body locking recess from the peripheral edge of the through hole can be prevented and a force for retaining the grommet on the through hole peripheral edge can be increased.

BRIEF DESCRIPTION OF THE DRAWINGS

FIG. 5 show a grommet according to a second embodiment, wherein

DETAILED DESCRIPTION OF THE PREFERRED EMBODIMENTS

Hereinafter, embodiments of a grommet according to the present invention are described with reference to the drawings.

Figure 1:
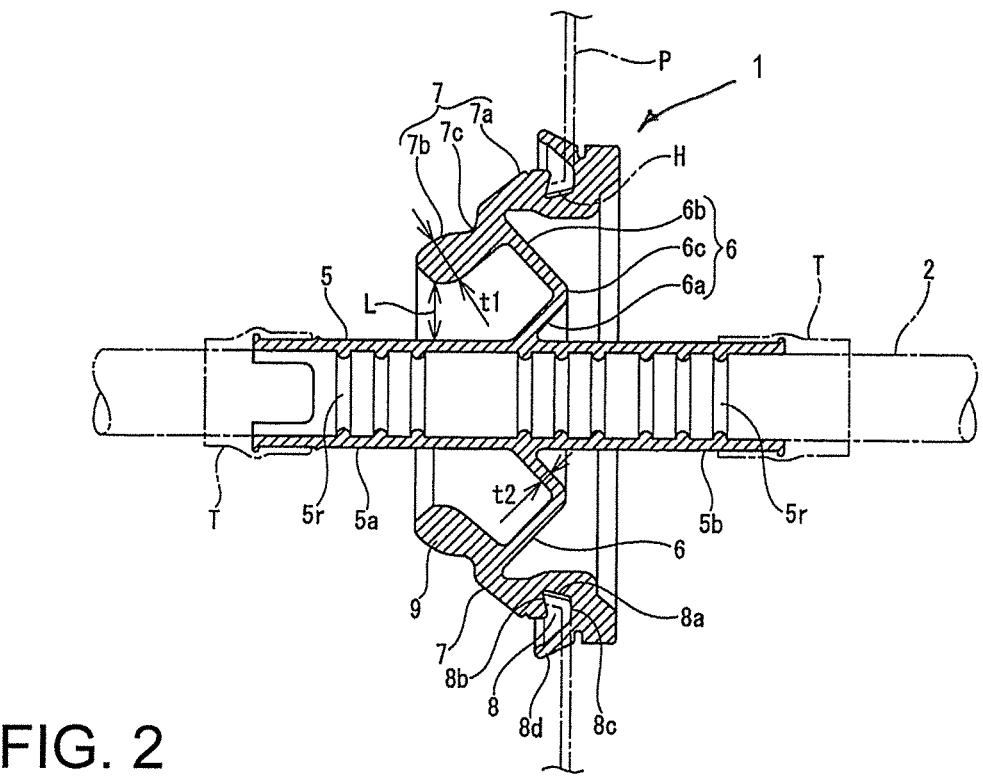
FIG. 1 is a section of a grommet according to a first embodiment of the present invention.
Figure 2:
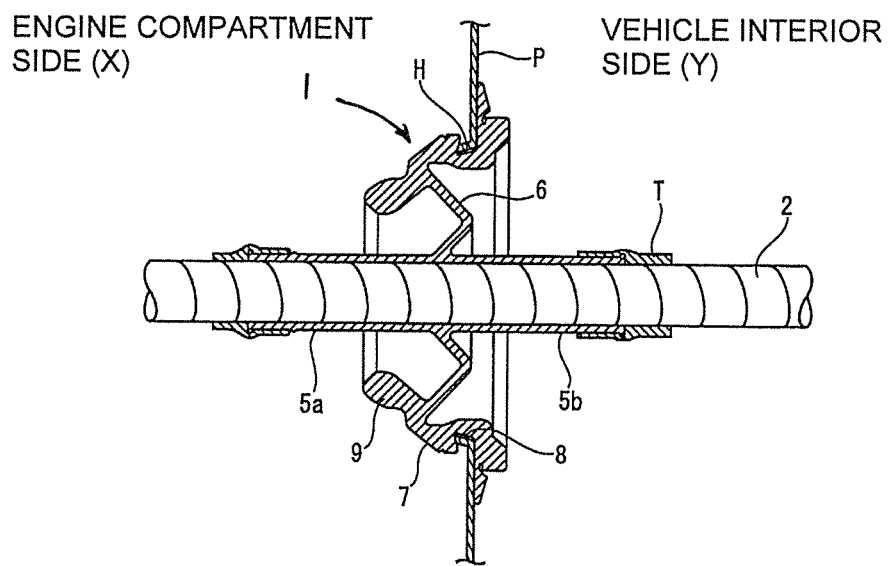
FIG. 2 is a section showing a state where a wire harness is mounted in a vehicle body with the grommet attached thereto.
Figure 3:
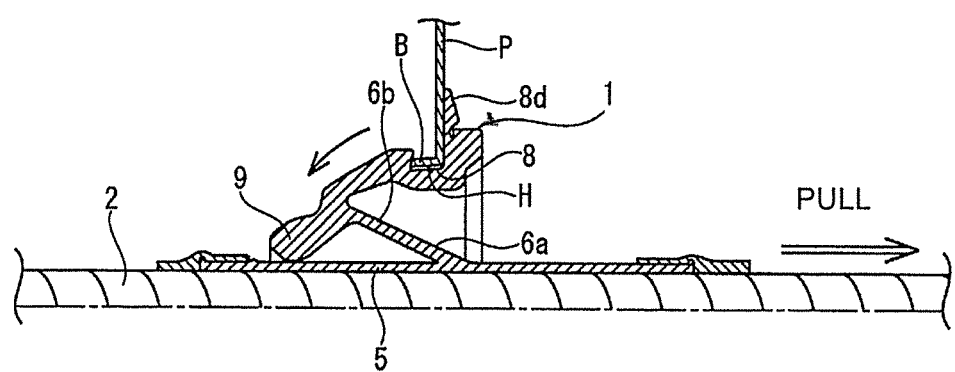
FIG. 3 is a section when a tensile force acts on the wire harness.

A grommet of a first embodiment is shown in FIGS. 1 to 3.

The grommet 1 is externally fitted to a wire harness 2 inserted through a through hole H formed in a vehicle-body panel P partitioning an engine compartment and a vehicle interior of an automotive vehicle and mounted into the through hole H.

The grommet 1 is integrally molded of rubber or elastomer and includes a small-diameter cylindrical portion 5 through which the wire harness 2 is tightly inserted, a radial projecting portion 6 in the form of bellows projecting radially outwardly from the enter outer periphery of an intermediate part of the small-diameter cylindrical portion 5 in a longitudinal direction and an outer peripheral cylindrical portion 7 in the form of a conical tube connected to the outer peripheral end of the radial projecting portion 6.

The radial projecting portion 6 is in the form of bellows with one V-shaped projecting portion. That is, the V-shaped projecting portion is formed such that an inner inclined portion 6a inclined in a diameter-increasing direction of the outer peripheral cylindrical portion 7 and an outer inclined portion 6b inclined in an opposite diameter-reducing direction are connected via a vertex 6c, and is deformable to shrink from the outer peripheral cylindrical portion 7 toward the small-diameter cylindrical portion 5.

As described above, the outer peripheral cylindrical portion 7 has a conical tubular shape and is connected at an intermediate position in a longitudinal direction thereof to the radial projecting portion 6, and an annular vehicle-body locking recess 8 is provided on the outer peripheral surface of a large-diameter side 7a of the outer peripheral cylindrical portion 7. Side walls of the vehicle-body locking recess 8 at the opposite sides of a bottom wall 8a are an inclined wall 8b and a vertical wall 8c at a leading end side, the vertical wall 8c projects more outwardly than the inclined wall 8b and a seal lip 8d is provided to cover the vehicle-body locking recess 8 at the projecting leading side.

Further, a thick portion 9 is provided over the entire circumference on a small-diameter side 7b of the outer peripheral cylindrical portion 7 and inclined in a direction to reduce the diameter of the thick portion 9 from a position connected to the radial projecting portion 6. An inner peripheral end which is a projecting end of the thick portion 9 has a minimum dimension L to the outer peripheral surface of the small-diameter cylindrical portion 5 and stops at a position where it comes into contact with the outer peripheral surface of the small-diameter cylindrical portion 5 even if the thick portion 9 is deformed inwardly and a tensile load acts. At this position, the vehicle-body locking recess 8 on the large-diameter side is not detached from the peripheral edge of the through hole. Thickness t1 of the thick portion 9 is two to four times as large as thickness t2 of the radial projecting portion 6.

Further, the length of the thick portion 9 extending in the diameter-reducing direction is about ½ of the length of the outer peripheral cylindrical portion 7 and a step portion 7c is provided on the outer peripheral surface between the thick portion 9 and the large-diameter side 7a.

The small-diameter cylindrical portion 5 projects outwardly through a hollow section surrounded by the outer peripheral cylindrical portion 7, in other words, there is formed a double structure composed of the small-diameter cylindrical portion 5 as an inner tube and the outer peripheral cylindrical portion 7 as an outer tube. The length of the small-diameter cylindrical portion 5 extending along an axial center line is two to three times as large as that of the outer peripheral cylindrical portion 7.

Further, anti-slip ribs 5r are provided on the inner peripheral surfaces of opposite side portions 5a, 5b of the small-diameter cylindrical portion 5 in the longitudinal direction while being spaced apart in an axial direction.

The grommet 1 is mounted on the wire harness 2 by inserting the wire harness 2 through the grommet 1 while the small-diameter cylindrical portion 5 of the grommet 1 is widened using a widening tool (not shown) and winding adhesive tapes T from the outer peripheral surface of the wire harness 2 to that of the small-diameter cylindrical portion 5 at ends of the opposite side portions 5a, 5b of the small-diameter cylindrical portion 5 in the longitudinal direction.

As shown in FIG. 2, at the time of continuously wiring the wire harness 2 in an engine compartment (X) and a vehicle interior (Y) through the through hole H of the vehicle-body panel P of the automotive vehicle, the grommet 1 is inserted into and engaged with the through hole H with burring of the vehicle-body panel P. Specifically, the grommet 1 is inserted into the through hole H by pushing one side part of the small-diameter cylindrical portion 5 or pulling the other side part and mounted into the through hole H by fitting the peripheral edge of the through hole H into the vehicle-body locking recess 8 of the grommet 1. In this mounted state, the burring B on the peripheral edge of the through hole comes into contact with the inner surface of the inclined wall 8b and the seal lip 8d at the vertical wall 8c side is pressed into contact with the vehicle body P on the through hole peripheral edge.

In many cases, the wire harness 2 pulled out from the grommet 1 mounted in the through hole H of the vehicle-body panel P needs to be bent downwardly or laterally at about 90° to be wired. During this time, since the radial projecting portion 6 connected to the small-diameter cylindrical portion 5 is formed to include the V-shaped projecting portion, the radial projecting portion 6 easily radially expands and contracts and the grommet 1 can follow a sudden bend of the wire harness 2 without problem by allowing a peripheral edge part in a bending direction to contact and an opposite side to expand.

Further, as shown in FIG. 3, a tensile force in a direction of an arrow may be exerted to the wire harness 2 inserted through the grommet 1 mounted in the through hole H of the vehicle-body panel P. At this time, the V-shaped projecting portion of the radial projecting portion 6 of the grommet 1 expands, whereby a force of pulling the outer peripheral cylindrical portion 7 inwardly acts and the vehicle-body locking recess 8 of the outer peripheral cylindrical portion 7 is more easily turned up in a direction to be detached from the peripheral edge of the through hole H.

At that time, since the small-diameter side of the outer peripheral cylindrical portion 7 includes the thick portion 9, it can be suppressed that the outer peripheral cylindrical portion 7 is pulled inwardly and deformed. Even if the outer peripheral cylindrical portion 7 is deformed, the thick portion 9 comes into contact with the outer peripheral surface of the small-diameter cylindrical portion 5 to stop the deformation, thereby preventing the deformation of the vehicle-body locking recess 8 on the other end side and reliably preventing detachment from the peripheral edge of the through hole H.

Figure 4:
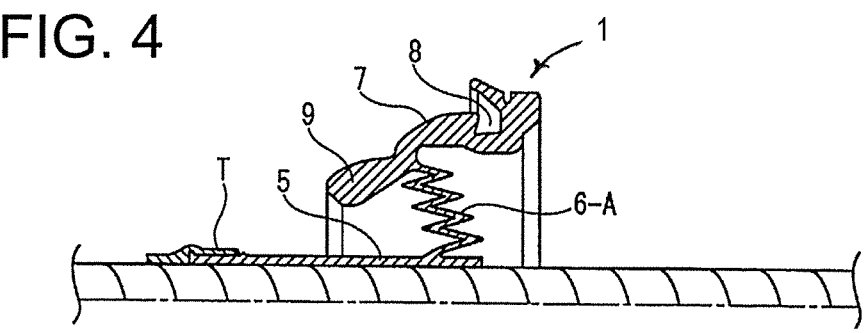
FIG. 4 is a section showing a modification of the first embodiment.

A modification of the first embodiment is shown in FIG. 4.

In this modification, a bellows-like part included in a radial projecting portion 6-A connecting the small-diameter cylindrical portion 5 and the outer peripheral cylindrical portion 7 is composed of a plurality of V-shaped projecting portions having a small pitch. Even if being formed into such a bellows-like shape, the radial projecting portion 6-A expands and contracts to follow a bend of the wire harness 2 when the wire harness 2 is bent and wired, wherefore the wire harness can be easily bent. Further, the leading end of the small-diameter cylindrical portion 5 is connected to the radial projecting portion 6, so that the small-diameter cylindrical portion does not penetrate through the outer peripheral cylindrical portion 7 along an axial center.

The small-diameter side of the outer peripheral cylindrical portion 7 is formed into the thick portion 9 as in the first embodiment and fulfills the same functions and effects. This point is not described here.

Figure 5A:
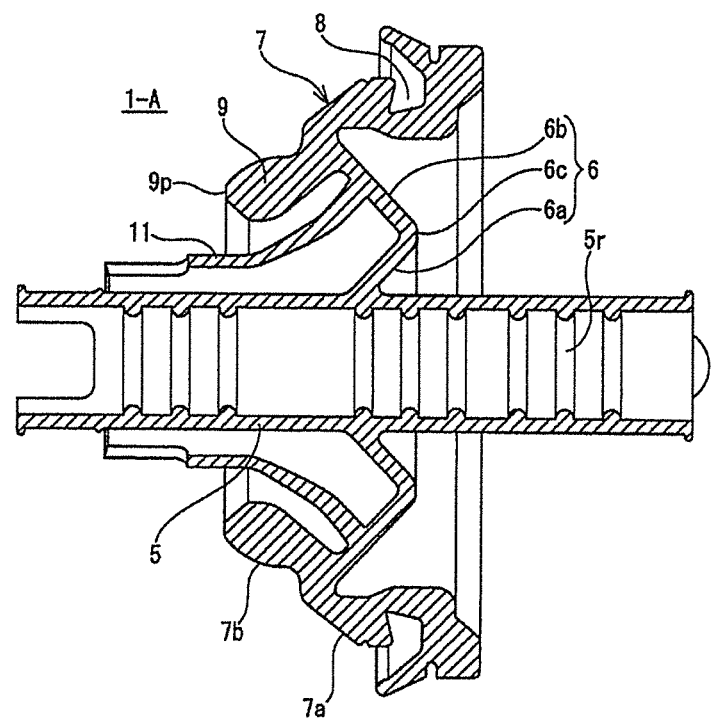
FIG. 5(A) is a section and FIG. 5(B) is a section showing a state where a sealed space for sound insulation is formed.
Figure 5B:
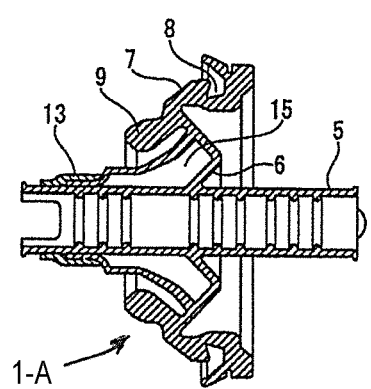
Figure 6A:
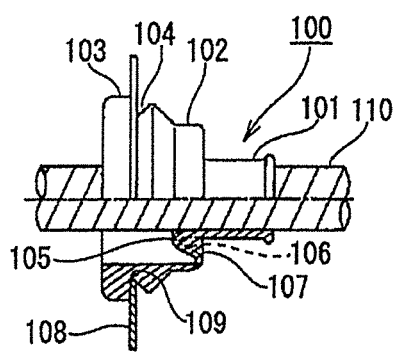
FIGS. 6(A) and 6(B) are views showing a prior art.
Figure 6B:
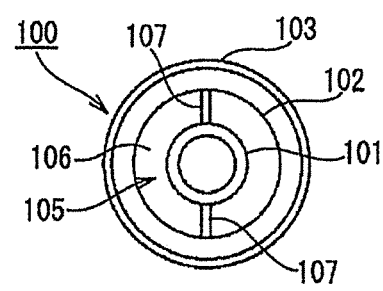

A second embodiment is shown in FIGS. 5(A) and 5(B).

In a grommet 1-A of the second embodiment, an intermediate cylindrical portion 11 projects from an outer inclined portion 6b on an outer peripheral side of a radial projecting portion 6 toward a space between the outer periphery of a small-diameter cylindrical portion 5 and the inner periphery of a small-diameter side 7b of an outer peripheral cylindrical portion 7. The projecting end of the intermediate cylindrical portion 11 projects beyond a small-diameter end 9b formed by a thick portion 9 of the outer peripheral cylindrical portion 7.

A sealed space 15 for sound insulation enclosed by the intermediate cylindrical portion 11, the small-diameter cylindrical portion 5 and the radial projecting portion 6 is formed by fixing the leading end of this intermediate cylindrical portion 11 to the outer peripheral surface of the small-diameter cylindrical portion 5 by an adhesive tape 13.

If the above configuration is adopted, noise in an engine compartment can be absorbed in the sealed space 15 for sound insulation to reduce or shut off transmission of noise to a vehicle interior when the small-diameter side 7b of the outer peripheral cylindrical portion 7 of the grommet mounted on a vehicle-body panel P is arranged in the engine compartment of an automotive vehicle. Since being the same as in the first embodiment, other functions and effects are not described.

The invention claimed is:

1. A grommet for wire harness to be fit externally to a wire harness to be wired in a vehicle and mounted into a through hole of a vehicle-body panel, comprising:
   a small-diameter cylindrical portion molded of rubber or elastomer and through which the wire harness is tightly inserted;
   a radial projecting portion that is in the form of a bellows projecting radially outwardly from an outer peripheral position of an intermediate part of the small-diameter cylindrical portion in a longitudinal direction; and
   an outer peripheral tubular portion having a conical tubular shape with a large diameter end, a small diameter end and an intermediate position between the large and small diameter ends in a longitudinal direction thereof, the intermediate position of the outer peripheral tubular portion being connected to an outer peripheral end of the radial projecting portion, an annular vehicle-body locking recess being provided on an outer peripheral surface of the outer peripheral tubular portion in proximity to the large-diameter end of the outer peripheral tubular portion, and areas of the outer peripheral tubular portion substantially adjacent the small-diameter end defining a thick portion that is thicker than the radial projecting portion.

2. A grommet for wire harness according to claim 1, wherein the radial projecting portion is in the form of bellows in which one V-shaped projecting portion projects in a diameter-increasing direction of the outer peripheral tubular portion.

3. A grommet for wire harness according to claim 2, wherein the small-diameter cylindrical portion has an axial length that is two to three times as large as an axial length of the outer peripheral tubular portion, the small-diameter cylindrical portion projects from both ends of the outer peripheral tubular portion in the longitudinal direction, and the wire harness inserted through the small-diameter cylindrical portion and both ends of the small-diameter cylindrical portion are fixed by winding a tape.

4. A grommet for wire harness according to claim 1, wherein the small-diameter cylindrical portion has an axial length that is two to three times as large as an axial length of the outer peripheral tubular portion, the small-diameter cylindrical portion projects from both ends of the outer peripheral tubular portion in the longitudinal direction, and the wire harness inserted through the small-diameter cylindrical portion and both ends of the small-diameter cylindrical portion are fixed by winding a tape.

* * * * *